(12) United States Patent
Kwon

(10) Patent No.: US 11,659,623 B2
(45) Date of Patent: May 23, 2023

(54) DUAL BOARDS AND METHOD FOR CONFIGURING MASTER/SLAVE OF DUAL BOARDS

(71) Applicant: HYOSUNG HEAVY INDUSTRIES CORPORATION, Seoul (KR)

(72) Inventor: Hyo Chul Kwon, Suwon-si (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 219 days.

(21) Appl. No.: 17/289,097

(22) PCT Filed: Oct. 8, 2019

(86) PCT No.: PCT/KR2019/013236
§ 371 (c)(1),
(2) Date: Apr. 27, 2021

(87) PCT Pub. No.: WO2020/091255
PCT Pub. Date: May 7, 2020

(65) Prior Publication Data
US 2022/0007460 A1    Jan. 6, 2022

(30) Foreign Application Priority Data

Oct. 31, 2018  (KR) .......................... 10-2018-0131601

(51) Int. Cl.
*G05B 19/00*  (2006.01)
*H04W 84/20*  (2009.01)
*G05B 19/042*  (2006.01)

(52) U.S. Cl.
CPC ........ *H04W 84/20* (2013.01); *G05B 19/0426* (2013.01); *G05B 2219/2231* (2013.01)

(58) Field of Classification Search
CPC .............. H04W 84/20; G05B 19/0426; G05B 2219/2231; G05B 9/03; G05B 19/414;
(Continued)

(56) References Cited

U.S. PATENT DOCUMENTS 6,065,102 A * 5/2000 Peters ................ G06F 12/0866
711/158
6,606,705 B1 * 8/2003 Volk .................... G06F 13/4072
710/52
(Continued)

FOREIGN PATENT DOCUMENTS

KR  10-2000-0026702 A   5/2000
KR     2000-0055954 A   9/2000
(Continued)

OTHER PUBLICATIONS

Anagha, A., and M. Mathurakani. "Prototyping of dual master I 2 C bus controller." 2016 International Conference on Communication and Signal Processing (ICCSP). IEEE, 2016. (Year: 2016).*

*Primary Examiner* — Michael D Masinick
(74) *Attorney, Agent, or Firm* — NKL Law; Jae Youn Kim

(57) ABSTRACT

A method for configuring a master/slave board during initial booting of dual boards, and dual boards thereof are proposed. Each of the dual boards includes: a voltage input part to which an AC voltage is applied by initial booting; a voltage converter for converting the applied AC voltage into a DC voltage; a communication part for transmitting a DC voltage value corresponding to the converted DC voltage to a counterpart board and receiving a DC voltage value of the counterpart board from the counterpart board; and a controller for initializing the voltage converter when an initial boot signal and the AC voltage are applied from outside, converting the DC voltage converted by the voltage converter into the DC voltage value, and comparing the DC voltage values of each board transmitted and received through the communication part, so as to configure each board as a master or slave board.

8 Claims, 2 Drawing Sheets

(58) Field of Classification Search
CPC ............... G05B 23/02; G05B 19/4144; G05B 23/0237; G06F 11/2028; G06F 11/2038; G06F 11/20; G06F 11/2033
See application file for complete search history.

(56) References Cited

U.S. PATENT DOCUMENTS

| | | | |
|---|---|---|---|
| 2006/0019629 A1* | 1/2006 | Berson | H04M 19/08 |
| | | | 455/402 |
| 2006/0069503 A1 | 3/2006 | Suomela et al. | |
| 2010/0302288 A1 | 12/2010 | Ren et al. | |
| 2020/0221362 A1* | 7/2020 | Kessler | H04W 36/305 |
| 2020/0274449 A1* | 8/2020 | Chieng | H02M 1/36 |
| 2020/0348716 A1* | 11/2020 | Kwon | G06F 9/4403 |
| 2022/0344825 A1* | 10/2022 | Ramasamy | H01Q 1/2258 |

FOREIGN PATENT DOCUMENTS

| | | |
|---|---|---|
| KR | 10-0320149 B1 | 1/2002 |
| KR | 10-2006-0031048 A | 4/2006 |
| KR | 10-2008-0020807 A | 3/2008 |
| KR | 10-1133903 B1 | 4/2012 |

\* cited by examiner

DUAL BOARDS AND METHOD FOR CONFIGURING MASTER/SLAVE OF DUAL BOARDS

TECHNICAL FIELD

The present disclosure relates to dual boards and, more particularly, to a method for configuring dual boards as master and slave boards respectively during initial booting of the dual boards, and dual boards thereof.

BACKGROUND ART

In general, in the case of a controller that controls an important facility, the controller is implemented in redundancy so as to achieve uninterrupted control even in the event of a sudden failure. Recently, there is an increasing number of cases in which boards, such as an operation board and a control board, that perform important functions are also implemented in redundancy within the controller.

In Korean Patent Application Publication No. 2000-0055954 and Korean Patent No. 0320149, a technology is disclosed wherein a failure of a master board is detected by a slave board through communication when a failure occurs during operation of the master board in dual boards, so that the slave board is allowed to be switched over by itself to serve as a master and operate as the master board.

However, the related document relates to a technology for switching between the master board and the slave board during operation of the dual boards, and does not propose a technology for configuring each of the master/slave boards at the time of initial booting of the dual boards.

In addition, in order to configure a master board and a slave board during initial booting of dual boards, a technology has been proposed in the related art, wherein the technology enables each board in redundancy to determine whether to operate as a master by reading a register value of each counterpart board, or to determine whether to serve as a master/slave by reading information of an external dip switch.

In the related art, since counterpart boards should read their information with each other, a certain amount of time is required to determine the master/slave. In addition, a setting error caused by an operator may occur when the dip switch is operated, and even when reading the information of the dip switch, a certain amount of time is required, thereby causing a problem. Such time consuming leads to a problem in that a time delay of operation occurs in a board that requires fast control.

In addition, as another method, a method of determining a master/slave board on the basis of clocks between two boards during initial booting of dual boards has been proposed, but there may be a difficulty in determining the master/slave board on the basis of the clocks between CPU boards such as a field programmable gate array (FGPA), which is widely used in recent years.

DISCLOSURE

Technical Problem

The present disclosure has been proposed to solve the problems of the related art described above, and an objective of the present disclosure is to provide dual boards enabling master and slave boards to be set by using a magnitude of the voltage applied to each board during initial booting of the boards implemented in redundancy, and a method thereof for configuring a master/slave of the dual boards.

In addition, another objective of the present disclosure is to provide a method for configuring a master/slave of dual boards that may quickly configure the master/slave boards through simple communication in the dual boards, and dual boards thereof.

Technical Solution

In the dual boards according to the exemplary embodiment of the present invention, each of first and second boards configured in redundancy includes: a voltage input part to which an AC voltage is applied by initial booting; a voltage converter for converting the applied AC voltage into a DC voltage; a communication part for transmitting a DC voltage value corresponding to the converted DC voltage to a counterpart board and receiving a DC voltage value of the counterpart board from the counterpart board; and a controller for initializing the voltage converter when an initial boot signal and the AC voltage are applied from outside, converting the DC voltage converted by the voltage converter into the DC voltage value, and comparing the DC voltage values of each board transmitted and received through the communication part, so as to configure each board as a master board or a slave board.

In the present invention, the controller may set a board having a relatively larger DC voltage value among the DC voltage values of each board as the master board.

In the present invention, the controller may set a preset board as the master board when the DC voltage values of the respective boards are the same.

In the present invention, the DC voltage value may have a digital value composed of 1 and 0, and when transmitting and receiving the digital value of the DC voltage value, the communication part may transmit and receive 1 bit to and from the counterpart board each other.

In addition, in a method for configuring a master/slave board of dual boards according to the exemplary embodiment of the present invention, the method includes: inputting a boot signal of each of the first and second boards and an AC voltage; initializing an internal voltage converter of each of the first and second boards when the AC voltage is input; converting the input AC voltage into a DC voltage by the first and second boards; respectively transmitting, by the first and second boards, their own DC voltage values corresponding to the converted DC voltage to counterpart boards, and respectively receiving the DC voltage values of the counterpart boards from the counterpart boards; and configuring the first and second boards as master or slave boards by comparing the DC voltage values of the first and second boards respectively transmitted and received by the first and second boards.

In the present invention, a controller may set a board having a relatively larger DC voltage value among the DC voltage values of each board as a master board.

In the present invention, a controller may set a preset board as a master board when the DC voltage values of the respective boards are the same.

In the present invention, a DC voltage value may have a digital value composed of 1 and 0, and when transmitting and receiving the digital value of the DC voltage value, each of communication parts and each of the counterpart boards transmit and receive 1 bit with each other.

Advantageous Effects

According to the present disclosure, since master/slave boards are respectively set by using the magnitude of the voltage applied from dual boards in a controller, simple and fast configuring is possible.

In addition, according to the present disclosure, since the same software is installed on each of the dual boards and the master/slave boards may be set without additional configuration, the productivity of a product is increased and the possibility of malfunction is reduced.

MODE FOR INVENTION

Figure 1:
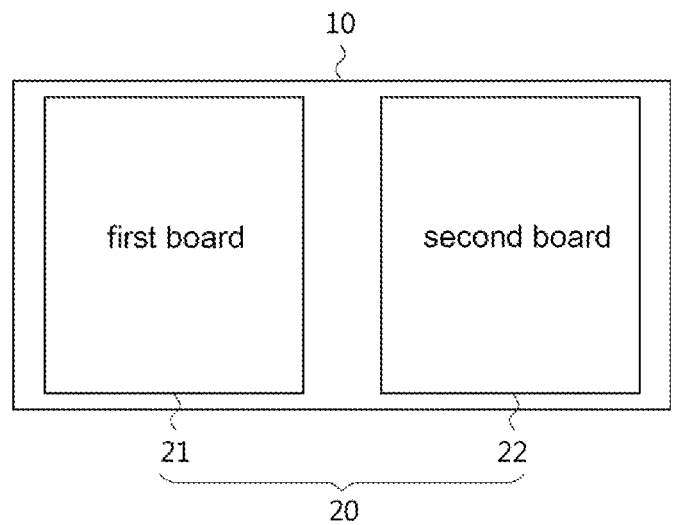
FIG. 1 is an exemplary view showing a device to which dual boards are applied according to an exemplary embodiment of the present disclosure.

Hereinafter, exemplary embodiments of the present disclosure are described in detail with reference to the accompanying drawings. In adding reference numerals to the components of each drawing, it should be noted that the same reference numerals are used to refer to the same components as much as possible even if displayed on different drawings. Further, in the following description, if it is decided that the detailed description of a known function or configuration related to the disclosure makes the subject matter of the disclosure unclear, the detailed description is omitted.

In addition, when describing the components of the present disclosure, terms such as first, second, A, B, (a), or (b) may be used. Since these terms are provided merely for the purpose of distinguishing the components from each other, they do not limit the nature, sequence, or order of the components. If a component is described as being "connected", "coupled", or "linked" to another component, that component may be directly connected or connected to that other component. However, it should be understood that yet another component between each of the components may be "connected", "coupled", or "linked" to each other.

FIG. 1 is an exemplary view showing a device to which dual boards are applied according to an exemplary embodiment of the present disclosure. Referring to FIG. 1, a device 10 to which dual boards 20 is applied according to the exemplary embodiment of the present disclosure includes a first board 21 and a second board 22, which are configured in redundancy. Since the first board 21 and the second board 20 are configured in redundancy, the same configurations (i.e., hardware) and the same functions (i.e., software and programs) are loaded. Such a device 10 may be configured in various forms. For example, the device 10 may be a controller that controls facilities or devices.

In addition, in the exemplary embodiment of the present disclosure, the first board 21 and the second board 22 are boards provided in a general controller, and collectively refers to boards that perform various functions, for example, an operation board, a control board, and the like. In addition, in the present disclosure, the boards 21 and 22 are used by conceptually including a device such as a controller or a control module.

Further, in the exemplary embodiment of the present disclosure, as an example, dual boards with two boards 21 and 22 are shown, but the present disclosure is not limited to the exemplary embodiment, and may be configured by multiplexing with two or more boards. That is, the method for configuring the master/slave boards according to the present disclosure may be equally applied to a multiplexing board. Accordingly, in the present disclosure, as an example, for convenience of description, dual boards will be described.

Figure 2:
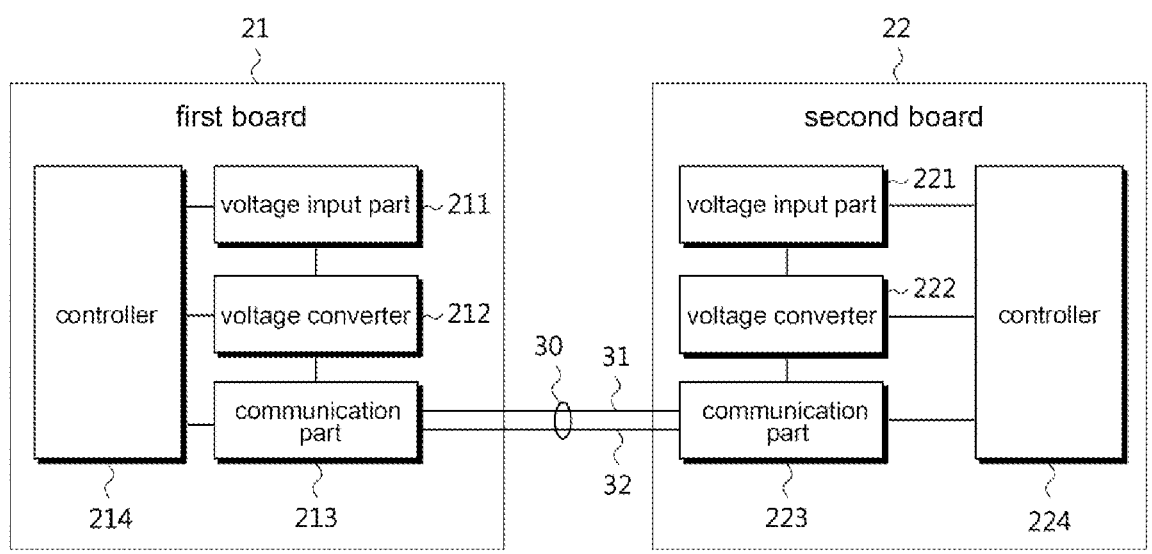
FIG. 2 is a block diagram of the dual boards according to the exemplary embodiment of the present disclosure.

FIG. 2 is a block diagram of the dual boards according to the exemplary embodiment of the present disclosure. As described above, since each of the boards 21 and 22 in redundancy has the same configurations and functions, only the first board 21 will be described below.

In the exemplary embodiment of the present disclosure, the first board 21 includes a voltage input part 211, a voltage converter 212, a communication part 213, and a controller 214.

The voltage input part 211 is applied with a voltage when the board 21 is initially booted. Such voltage may be a starting voltage supplied from a separate power supply (e.g., SMPS) when a device is booted in a state where the board 21 is powered off, that is, specifically in a state where the device including the corresponding board 21 is powered off. In this way, when power is supplied to boot the device, the power is also supplied to the board 21. The voltage input to the voltage input part 211 may preferably be an alternating current (AC) voltage.

The voltage converter 212 converts the voltage input to the voltage input part 211 into a direct current (DC) voltage. Such voltage converter 212 may use, for example, an ADC conversion element. In this way, the DC voltage converted by the voltage converter 212 is input to the controller 214, and the controller 214 stores a digital value (i.e., DC voltage value) for the DC voltage in an internal memory (not shown).

The communication part 213 transmits the DC voltage value stored as described above to the counterpart board 22 and receives the DC voltage value of the counterpart board 22 transmitted from the counterpart board 22. The transmission and reception of such a DC voltage value is equally applied to both boards 21 and 22. That is, the second board 22 also transmits its own DC voltage value to the first board 21 and, conversely, receives the DC voltage value of the first board 21 from the first board 21.

In addition, the communication part 213 transmits the digital value through a differential communication line 30 connected between the first and second boards 21 and 22. Such a differential communication line 30 supports the first board 21 and the second board 22 to respectively transmit the digital values to each other by 1 bit.

The controller 214 compares the two DC voltage values, which are transmitted and received through the communication part 213, with each other so as to configure master/slave boards. As a result of the comparison, among the two DC voltage values, a board having a relatively larger DC voltage value is set as a master board, and a board having a relatively smaller DC voltage value is set as a slave board. In this way, in the configuring of the master/slave boards, among the first and second boards 21 and 22 configured in redundancy, the board to which the higher voltage is applied according to a magnitude of the voltage applied during initial booting is set as the master board.

To this end, the controller 214 receives an initial boot signal from an external CPU, and initializes the voltage converter 212 when the initial boot signal is received. Such initialization is performed by the first and second boards 21 and 22 in the same manner That is, when the initial boot signal is input from the external CPU to the first and second boards 21 and 22, the controllers 214 and 224 respectively initializes their own voltage converters 212 and 222. This is to compare the respectively received DC voltage values with each other in the initialized state. In this case, since each of the controllers 214 and 224 of the two boards 21 and 22 may check both its own DC voltage value and the DC voltage value of its counterpart board, it is possible for each board to determine whether to configure itself as a master board or a slave board.

As described above, the two boards 21 and 22 configured in redundancy are substantially the same board. That is, the two boards 21 and 22 are the same boards that have the same configurations and functions, and operate substantially the same. However, even when the two boards 21 and 22 are the same as described above, the performance of the two boards 21 and 22 may be slightly different when used for a long period of time. In this case, in the present disclosure, after power is applied to the first and second boards 21 and 22 at the same time, the levels of the applied voltage is checked by each other, so as to configure the board with the larger voltage as the master board. In this way, the board with excellent performance may be quickly set as the master board.

When the DC voltage values of the first and second boards 21 and 22 are the same, a preset board among the two boards may be set as the master board and the other board may be set as the slave board.

Figure 3:
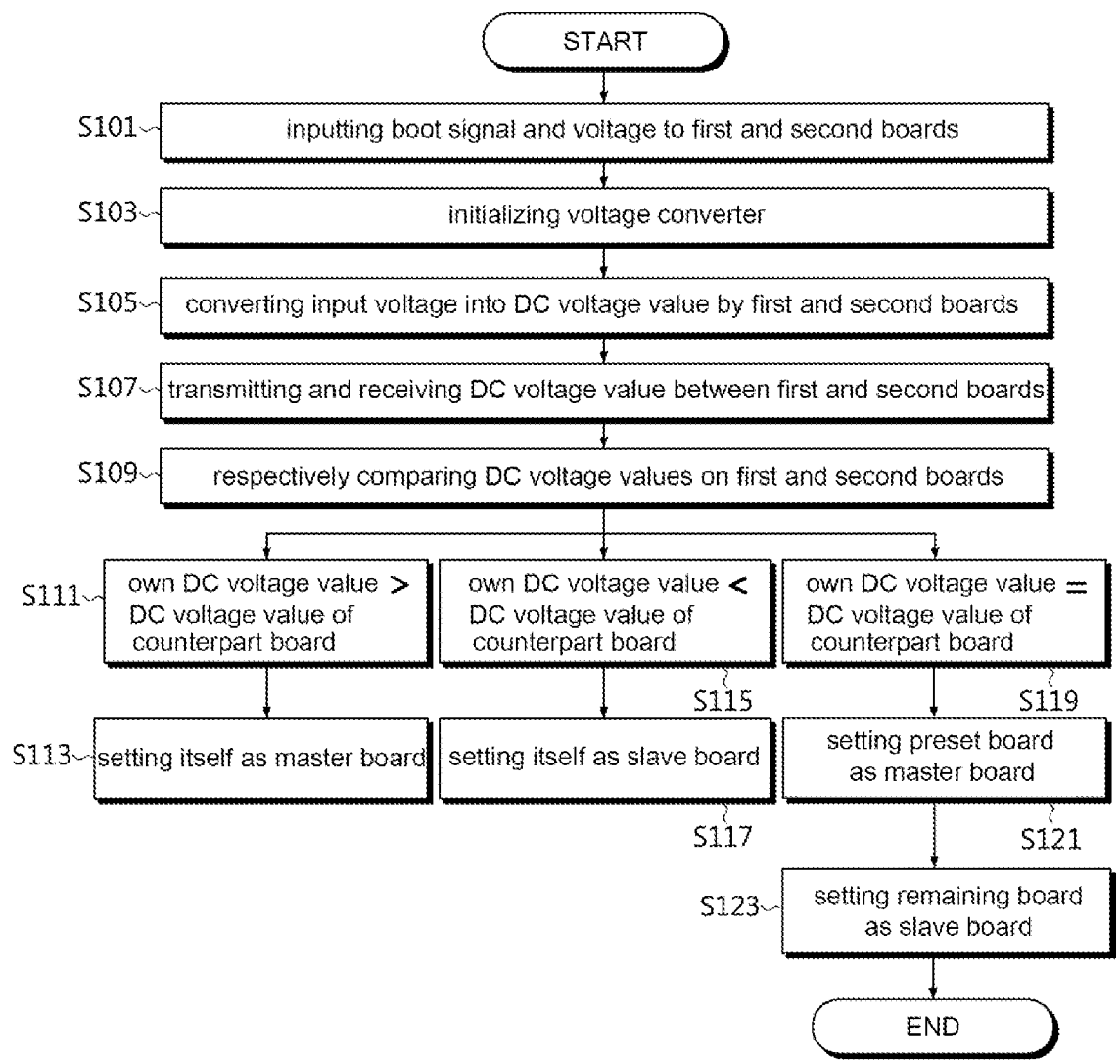
FIG. 3 is a flowchart showing a method for configuring a master/slave of the dual boards according to the exemplary embodiment of the present disclosure.

FIG. 3 is a flowchart showing a method for configuring a master/slave of the dual boards according to the exemplary embodiment of the present disclosure.

Referring to FIG. 3, in a method for configuring a master/slave of dual boards according to the present disclosure, there are provided steps as follows: in step S101, a voltage is applied together with a boot signal from outside to a first board 21 and a second board 22 configured in redundancy, and in step S103, controllers 214 and 224 respectively initialize their own voltage converters 212 and 222.

Next, in step S105, the first and second boards 21 and 22 respectively convert voltage input to each board into DC voltage values that are digital values corresponding to the voltage, and in step S107, each of their own DC voltage values is transmitted to each of the counterpart boards. In other words, each of the first and second boards 21 and 22 transmits its own DC voltage value to each counterpart board and receives the DC voltage value of each counterpart board from each of the counterpart boards.

Next, in step S109, the first and second boards 21 and 22 compare the two transmitted/received DC voltage values. In this comparison, in step S111, the first board determines whether its own DC voltage value is greater than the DC voltage value of the second board, in step S113, the first board sets itself as a master board, in step S115, the first board determines whether its own DC voltage value is smaller than the DC voltage value of the second board, and in step S117, the first board sets itself as a slave board.

In step S119, the two DC voltage values are determined to be the same in the comparison of step S109, in step S121, a preset board among the two boards is set as the master board, and in step S123, the other board is set as the slave board.

As described above, in the present disclosure, the board having the larger DC voltage value is set as the master board by comparing each DC voltage value of the dual boards each having the same configurations and functions, and the counterpart board is set as the slave board. This method has the advantage of being able to quickly set the master board in a simple way through communication between the boards.

In the description above, although the components of the embodiments of the present disclosure may have been explained as assembled or operatively connected as a unit, the present disclosure is not intended to limit itself to such embodiments. That is, within the scope of the present disclosure, all of the components may be selectively combined and operated in any numbers. In addition, the terms "comprise", "include", or "have" described above mean that the corresponding component may be inherent unless otherwise stated, and thus should be construed to further include other components and not to exclude other components. That is, terms like "include", "comprise", and "have" should be interpreted in default as inclusive or open rather than exclusive or closed unless expressly defined to the contrary. In the following description, unless otherwise defined, all terms including technical and scientific tenns used herein have the same meaning as commonly understood by one of those skilled in the art to which this disclosure belongs. Commonly used terms, such as pre-defined terms, should be interpreted as being consistent with the contextual meaning of the related art, and are not to be interpreted as ideal or excessively formal meanings unless explicitly defined in the present disclosure.

Although exemplary aspects of the present disclosure have been described for illustrative purposes, those skilled in the art will appreciate that various modifications, additions and substitutions are possible, without departing from essential characteristics of the disclosure. Therefore, the embodiments disclosed in the present disclosure are not intended to limit the technical idea of the present disclosure but to describe the present disclosure, and the scope of the technical idea of the present disclosure is not limited by these embodiments. The scope of protection of the present disclosure should be interpreted by the following claims, and all technical ideas within the scope equivalent thereto should be construed as being included in the scope of the present disclosure.

The invention claimed is:

1. First and second boards configured in redundancy, each of the first and second boards comprising:
 a voltage input part to which an AC voltage is applied by initial booting;
 a voltage converter for converting the applied AC voltage into a DC voltage;
 a communication part for transmitting a DC voltage value corresponding to the converted DC voltage to a counterpart board and receiving a DC voltage value of the counterpart board from the counterpart board; and
 a controller for initializing the voltage converter when an initial boot signal and the AC voltage are applied from outside, converting the DC voltage converted by the voltage converter into the DC voltage value, and comparing the DC voltage values of each board transmitted and received through the communication part, so as to configure each board as a master board or a slave board.

2. The first and second boards of claim 1, wherein the controller sets a board having a relatively larger DC voltage value among the DC voltage values of each board as the master board.

3. The first and second boards of claim 1, wherein the controller sets a preset board as the master board when the DC voltage values of the respective boards are the same.

4. The first and second boards of claim 1, wherein the DC voltage value has a digital value composed of 1 and 0, and when transmitting and receiving the digital value of the DC voltage value, the communication part transmits and receives 1 bit to and from the counterpart board each other.

5. A method for configuring a master/slave of first and second boards configured in redundancy, the method comprising:

inputting a boot signal of each of the first and second boards and an AC voltage;

initializing an internal voltage converter of each of the first and second boards when the AC voltage is input;

converting the input AC voltage into a DC voltage by the first and second boards;

respectively transmitting, by the first and second boards, their own DC voltage values corresponding to the converted DC voltage to counterpart boards, and respectively receiving the DC voltage values of the counterpart boards from the counterpart boards; and configuring the first and second boards as master or slave boards by comparing the DC voltage values of the first and second boards respectively transmitted and received by the first and second boards.

6. The method of claim 5, wherein a controller sets a board having a relatively larger DC voltage value among the DC voltage values of each board as a master board.

7. The method of claim 5, wherein a controller sets a preset board as a master board when the DC voltage values of the respective boards are the same.

8. The method of claim 5, wherein a DC voltage value has a digital value composed of 1 and 0, and when transmitting and receiving the digital value of the DC voltage value, each of communication parts and each of the counterpart boards transmit and receive 1 bit with each other.

* * * * *